United States Patent [19]

Kaku et al.

[11] Patent Number: 4,663,751
[45] Date of Patent: May 5, 1987

[54] OPTICAL INFORMATION PROCESSOR FOR COMPENSATING OFFSET

[75] Inventors: Toshimitsu Kaku, Hachioji; Yoshito Tsunoda, Mitaka; Takeshi Maeda, Kokubunji; Shigeru Nakamura, Hachioji, all of Japan

[73] Assignee: Hitachi, Ltd., Tokyo, Japan

[21] Appl. No.: 515,520

[22] Filed: Jul. 20, 1983

[30] Foreign Application Priority Data

Jul. 21, 1982 [JP] Japan ............................ 57-125702

[51] Int. Cl.$^4$ .................. G11B 7/095; G11B 21/10
[52] U.S. Cl. .............................. 369/46; 369/44; 369/109
[58] Field of Search ........................... 369/43–46, 369/109–112; 250/201 DF

[56] References Cited

U.S. PATENT DOCUMENTS

| 3,962,721 | 6/1976  | de Haan        | 369/46 X  |
| 4,455,632 | 6/1984  | Braat          | 369/46 X  |
| 4,467,462 | 8/1984  | Shibata        | 369/44 X  |
| 4,484,319 | 11/1984 | Koishi et al.  | 369/46    |
| 4,502,134 | 2/1985  | Kondo et al.   | 369/46    |
| 4,505,584 | 3/1985  | Kato et al.    | 369/46 X  |
| 4,525,823 | 6/1985  | Sugiyama et al.| 369/46 X  |
| 4,527,263 | 7/1985  | Nakagawa       | 369/111 X |
| 4,589,103 | 5/1986  | Tajima         | 369/46    |
| 4,608,680 | 8/1986  | Yano           | 369/46 X  |

Primary Examiner—Raymond F. Cardillo
Assistant Examiner—Wayne R. Young
Attorney, Agent, or Firm—Antonelli, Terry & Wands

[57] ABSTRACT

An optical information processor including a recording medium with a guide groove having interrupting portions therealong in the form of mirror areas for reflecting light impinging on the recording medium. A light detector is provided for receiving diffraction light from the guide groove with a first signal detector being provided for differentially operating on signals from the light detector and generating a tracking signal tracking the guide groove. Additionally, a second signal detector is provided for detecting the signal from the light detector indicative of the mirror areas and providing an output indicative thereof which is utilized for compensating the tracking signal. The compensated tracking signal is then utilized for controlling the positioning of the light beam on the recording medium.

8 Claims, 18 Drawing Figures

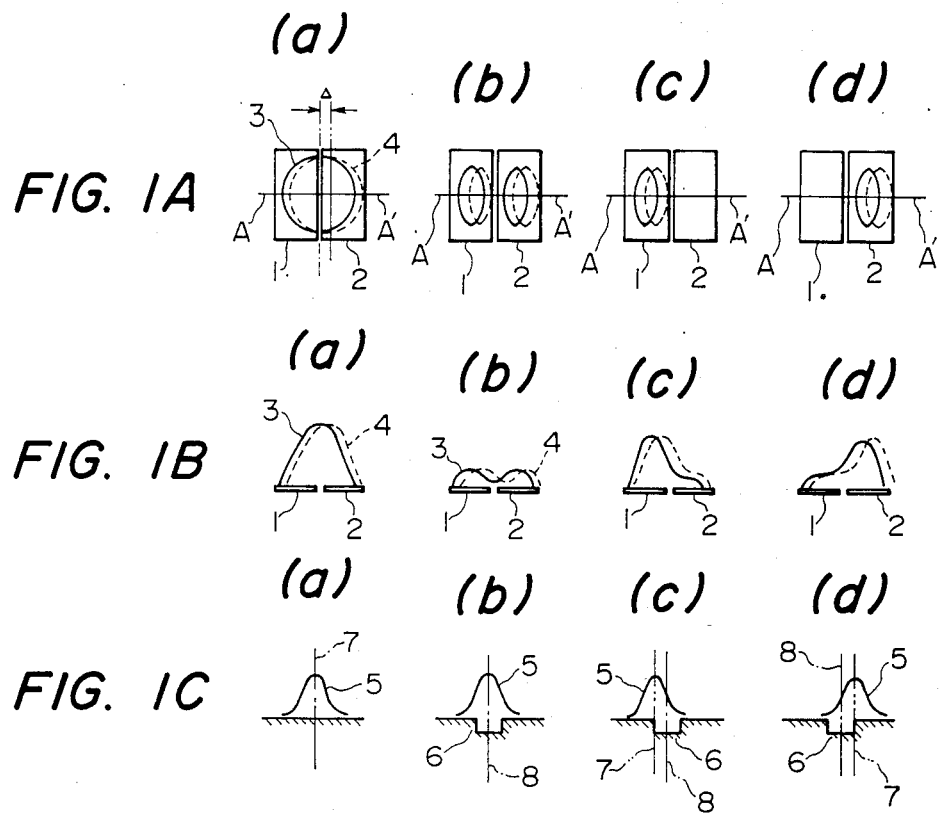
FIG. 1A
FIG. 1B
FIG. 1C
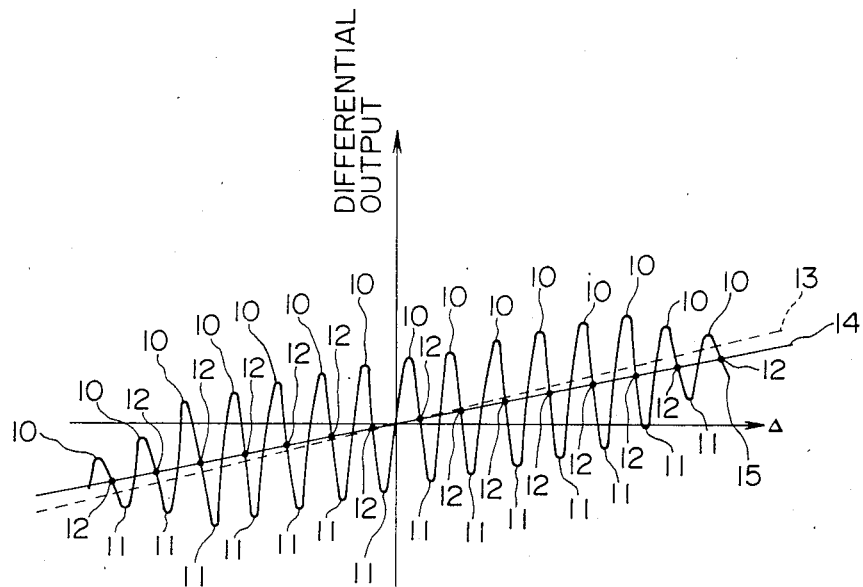
FIG. 2

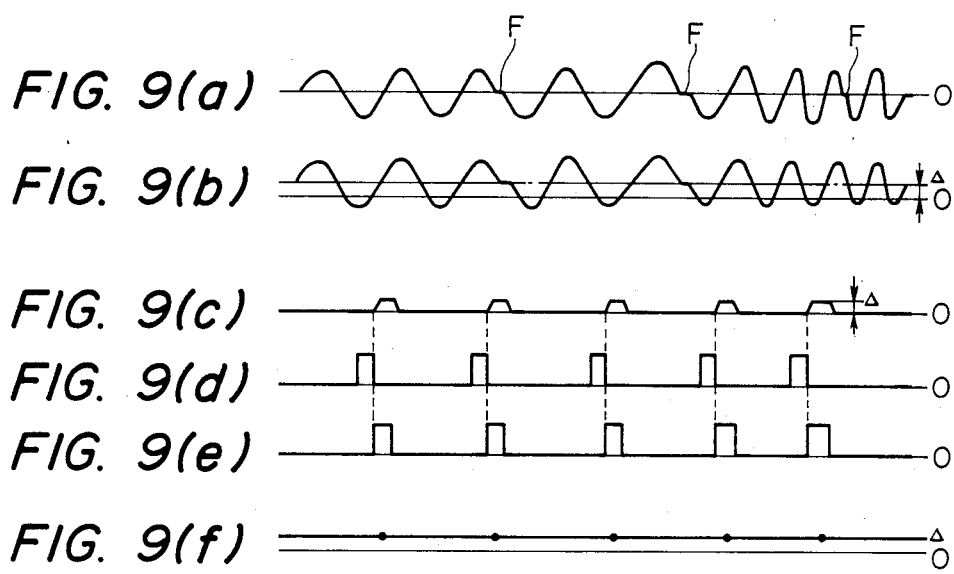

OPTICAL INFORMATION PROCESSOR FOR COMPENSATING OFFSET

BACKGROUND OF THE INVENTION

1. Field of the Invention

This invention relates to an optical information processor and more particularly, to an apparatus for tracking an information track by means of diffraction light from the information track.

2. Description of the Prior Art

In a conventional optical disk for storing digital information in such a manner that the information can be optically recorded and reproduced, an additional recording system has been proposed in which a groove for guiding a light beam is defined in advance on the optical disk in order to additionally record the information, and when the information is recorded, a light beam spot is guided by this guide groove to sequentially record the information (Press Information Philips, Nov. 7th, 1978).

On the other hand, an apparatus has also been proposed in which the diffraction light from an information track on an optical disk is received by two light detectors that are juxtaposed with each other to interpose the track between them and the output of each detector is differentially operated so as to track the guide groove (e.g., Japanese Patent Laid-Open No. 60,702/1974). However, since the optical detectors are disposed in the far-field zone of the diffraction light, offset is liable to occur in a tracking signal if the optical beam is moved or the disk is tilted so that tracking can not be made normally.

FIG. 1 illustrates schematically why offset occurs in the tracking signal due to the spot movement on the surface of the optical detector in a tracking signal detection apparatus using the diffraction light. FIGS. 1A(a) through 1A(d) are plan views of the positions of the light spots on the optical detector (having the light receiving surfaces 1, 2), and FIGS. 1B(a) through 1B(d) are sectional views corresponding to the center line A—A', respectively, and illustrate the intensity distribution of the light spot. FIG. 1(c) is a sectional view showing the relation of the intensity distribution of the light spot converged by an objective lens on the disk surface and the position of the groove. In the case of FIG. 1(C)(a), the center 7 of the light spot is placed on the position of the disk surface where the groove does not exist and in the case of FIG. 1(C)(b), the center is in agreement with the center 8 of the groove. In the case of FIG. 1(C)(c), the light spot is located at the extreme left of the groove (or inside the rotation of the disk) and in the case of FIG. 1(C)(d), the spot is located at the extreme right (or outside the rotation of the disk). In FIG. 1, the spot 4 on the optical detector, represented by dotted line, is generated by the inclination of the optical axis of the objective lens or when the optical axis is moved in order to follow up the off-center.

In FIGS. 1A(a) through 1A(d), the light receiving surface of the optical detector is divided into two portions 1 and 2 and the gap between them is extremely small. When the spot on the disk surface is situated at the center of the groove 6, the spot on the optical detector assumes the position shown in FIG. 1B(b) and the same quantity of diffraction light is incident to the two light receiving surfaces 1 and 2, as represented by solid line 3. If the position of the spot moves under this state due to the inclination of the disk, however, the state such as represented by dotted line 4 is established.

The tracking signal obtained by the diffraction light generally uses the differential signal of the outputs of the light receiving portions 1 and 2 in order to detect the unbalance of the diffraction light. If the spot position described above moves, the differential signal between the outputs of the light receiving portions 1 and 2 does not become zero, even though the center of the spot 7 on the disk surface is in agreement with the center 8 of the groove 6. Thus, offset occurs in the tracking signal.

Furthermore, in the case of FIG. 1(C)(c) where the center 7 of the spot on the disk surface is situated at the extreme left of the groove 6, the intensity distribution of the spot on the surface of the optical detector becomes such as shown in FIG. 1(B)(c), so that the quantity of light incident to the light receiving portion 1 becomes great as shown in FIG. 1A(c), the unbalance takes place between the differential outputs of the light receiving portions 1 and 2 and hence, the quantity and direction of deviation between the center of spot on the disk surface and the center of the track can be detected. If the center of the spot on the disk surface is situated at the extreme right of the groove as shown in FIG. 1(C)(d), the intensity distribution of the spot on the surface of the optical detector becomes such as shown in FIG. 1(B)(d), and the quantity of light incident to the light receiving portion 2 becomes great, as shown in FIG. 1A(d), so that the differential outputs of the light receiving portions 1 and 2 become opposite to those shown in FIG. 1(C)(c).

SUMMARY OF THE INVENTION

In tracking the guide groove by detecting the unbalance of the diffraction light, the present invention is directed to eliminate the offset component of the tracking signal due to the inclination of the disk.

The characterizing feature of the present invention for accomplishing the object described above resides in that the offset is compensated for by utilizing a mirror area which is disposed inside the guide track, that is, a portion which reflects the light spot substantially as such. Since only the offset component of the tracking signal appears on this reflecting surface, this component is detected and held in order to compensate for the tracking signal and to accurately track the guide groove.

BRIEF DESCRIPTION OF THE DRAWINGS

FIGS. 1A(a–d), 1B(a–d), 1C(a–d) are schematic views useful for explaining the principle why the offset occurs;

FIG. 2 is a diagram useful for explaining the change of the output from a detector;

FIG. 9(a-f) shows waveforms obtained in accordance with the embodiment of FIG. 7.

DESCRIPTION OF THE PREFERRED EMBODIMENT

Figure 3A:
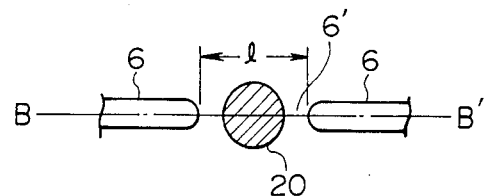
FIGS. 3(a), 3(b) and 3(c) illustrate portions of an optical disk having a guide groove and interrupting portions of a mirror area.

The principle of the present invention will be now explained with reference to FIG. 2. FIG. 2 shows the change of the differential output 15 of the light receiving portions 1 and 2 when the position of the spot on the optical detector is deviated by a deviation quantity Δ while the center 7 of the spot on the disk surface passes through the groove 6 from the extreme left to the extreme right. A point 10 represents the case where the center 7 of the spot on the disk surface is placed at the extreme left of the groove 6 and a point 11 represents the case where the center 7 is located at the extreme right of the groove 6. A black point 12 represents the case where the center 7 of the spot is at the center of the groove 6. A solid line 14 connects the black point 12. When the differential output 14 is regarded as the tracking signal, this solid line 14 represents the relation between the movement of the spot on the surface of the optical detector and the offset.

On the other hand, a dotted line 13 represents the differential output of the light receiving portions 1 and 2 in the cases shown in FIGS. 1A(a), 1B(a) and 1C(a), that is, when the spot on the disk surface is placed on the full reflecting surface devoid of the groove and the spot on the surface of the optical detector moves by Δ.

As can be seen clearly from FIG. 2, the ratio of deviation quantity of the dotted line 13 and the solid line 14 with respect to the amplitude of the differential output 15 is small and the value of the dotted line 13 may substantially substitute that of the solid line 14 when the moving quantity of the spot on the surface of the optical detector is small. Since the output represented by the dotted line 13 is the differential output of the light receiving portions 1 and 2 on the mirror area, the offset component can be eliminated by disposing the mirror area at a part of the groove, picking up the value of the differential output when the light spot passes by the mirror area and compensating for the differential output using this value.

FIG. 3 schematically illustrates a portion of an optical disk equipped with the mirror area described above in accordance with one embodiment of the present invention.

Figure 3B:
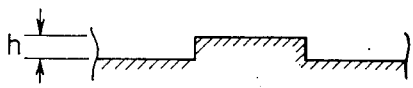
Figure 3C:
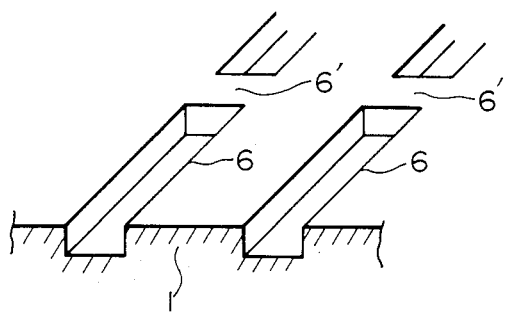

In FIG. 3, the mirror area is shown disposed at a part inside the groove 6. In other words, the groove 6 is interrupted at its part by the mirror area 6'. FIG. 3(b) is a sectional view taken along line B—B' of FIG. 3(a). FIG. 3(c) is a sectional view in the radial direction of the disk. In the drawings, reference numeral 1 represents a substrate (such as polyvinyl chloride, glass or the like).

Preferably, the length l of the interrupting portion is such that the spot 20 is not affected by the groove 6 around it when the spot 20 is located at the interrupting portion. For example, the length is at least the size of the spot used (the diameter at which the spot intensity becomes $1/e^2$). The groove depth h may be λ/8 (λ: the wavelength of the laser light used) in terms of the length of the optical path, but it may change depending upon other conditions. The shape of the groove is not particularly limitative, either, in the present invention. Incidentally, a disk having a guide groove having a λ/8 optical path length shown in FIG. 3 is disclosed in Japanese Patent Laid-Open No. 130,102/1979 (corresponding to U.S. Pat. No. 4,363,116).

Figure 4:
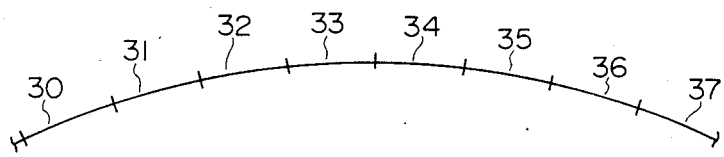
FIG. 4 is a representation of a portion of an optical disk having a guide groove with a plurality of segments.
Figure 5:
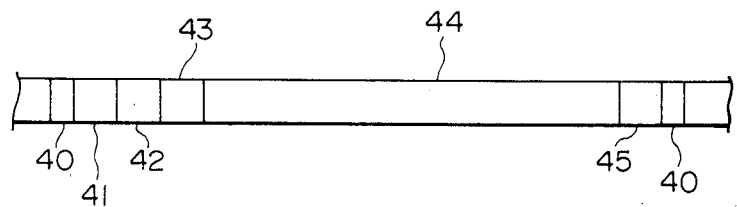
FIG. 5 illustrates a more detailed representation of a segment or sector portion of a guide groove.

FIG. 4 shows an example of sector portions of an optical disk having a guide groove disclosed in Japanese Patent Laid-Open No. 130,102/1979. In this optical disk, the use range is between the outermost diameter of 280φ and the innermost diameter of 180φ and 32,000 tracks are recorded in advance with 1.6 μm pitch intervals over the length of 50 mm in the radial direction. Each track is divided into 64 segments in the circumferential direction, and each segment is referred to as a "sector portion" and serves as a portion which separates the information. FIG. 4 shows the sector portions 30, 31, 32, 33, 34, 35, 36 and 37 of one track that is divided. A more detailed construction of the sector portion 34, for example, is illustrated in FIG. 5. A mark 40 represents the start of the sector (which is referred to as a "sector mark"), followed then by a signal 41 for operating a circuit (generally, PLL (phase locked loop)) for generating clocks to detect address information and by address information 42. These three signals are recorded in advance.

The portions in which these signals are recorded are generally recorded by phase type recording and the pits existing at the phase type recorded portions are not shown in FIG. 3. Next, an information recording area 44 constituted by the guide groove is then disposed. This region is generally recorded by intensity type recording. The intensity type portion is a metal thin film which is vapor-deposited or applied on the groove 6 which is in turn formed on the substrate. However, the metal thin film is not shown in FIG. 3.

A gap area 43 is disposed before the recording area 44. This area is to detect the information signal and to provide a sufficient time margin before the start of recording. Hence, recording is not substantially made on this area. An area 45 is a buffer area which absorbs the increase of the recording area due to the change of rotation, clock phase jitter, and the like.

In the optical disk capable of recording, of the kind described above, the portion into which the reflecting surface is inserted is suitably the gap 43 or the buffer 45. In accordance with the present invention, any area may be used for this purpose without being particularly limited to the sector structure described above, so long as no problem occurs in carrying out data processing.

Figure 6:
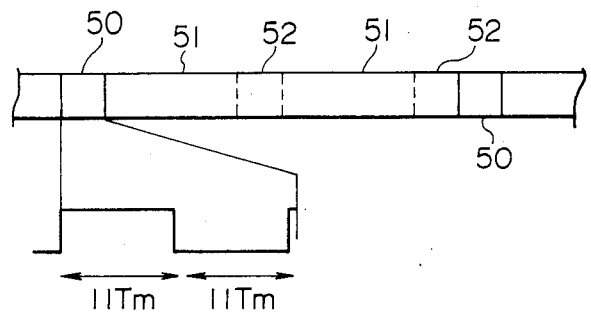
FIG. 6 illustrates the manner in which information is recorded in the guide groove.

One of the applications of the optical disk is an optical disk for audio equipment, and a structure such as one shown in FIG. 6 has been proposed as its signal mode. In FIG. 6, the segment of the information is referred to as a "frame" in the same way as the sector described above. In one frame, a synchronizing pattern 50 for synchronization is disposed at the leading edge of the frame, followed then by a data area 51 and a parity area 52. Once again, the data area 51 and the parity area 52 are disposed. The synchronizing pattern 50 consists of two patterns each having a length of 11 Tm (Tm: geometric unit on the disk; e.g., 0.289 μm) and either of them corresponds to the mirror area. To reproduce the data, this synchronizing pattern must be detected, and hence, the offset component described already can be detected simultaneously. The data recorded on the data portion and the parity portion use EFM (eight to fourteen modulation), a modification of an FM modulation whose pulse length changes. Accordingly, there exist data pits and mirror areas ranging from 3 Tm to 11 Tm. If a semiconductor laser is used as the light source and an objective lens having NA of 0.5 is used, the spot size on the disk surface is about 1.6 μm so that the mirror area of at least 6 Tm and the track offset at this time can be detected simultaneously.

Next, the methods of detecting the mirror area will be explained.

First, there is a method which detects offset on the real time basis. It is necessary to detect the existence of the light spot at the position of the mirror area. This can be accomplished by reading the information which is recorded ordinarily on the optical disk and then referring to a signal after digital conversion. In the case of the optical disk for audio equipment, for example, a geometric length ranging from 6 Tm to 11 Tm exists. (In the optical disk for audio equipment, control is made so that the linear velocity becomes constant; hence, linear correspondence exists between the time length and the geometric length.) For this reason, the time width is measured in order to detect the timing at which the length exceeds 6 Tm.

In the case of an optical disk capable of additional recording, the time interval from the sector mark to the portion into which the mirror area is inserted is known in advance. Accordingly, the sector mark is first detected and the time is thereafter measured so as to detect the timing at which the light spot comes into the mirror area.

If the area of 11 Tm among the synchronizing pattern is used in the optical disk for audio equipment, one synchronizing pattern is first detected and the time till the arrival of the next synchronizing pattern, which is known in advance, is measured so as to detect the existence of the light spot in the 11 Tm area in the next synchronizing pattern.

In accordance with the methods described above, the differential output of the optical detector is sampled and held by the timing detected by the methods described above, so that the offset component can be detected and held.

If a method which causes time delay is used in order to detect the existence of the light spot in the mirror area, the differential output of the optical detector may be analog-delayed to an extent corresponding to the time delay. A CCD (charge coupled device) or a delay line may be used to practice the analog delay method.

Figure 7:
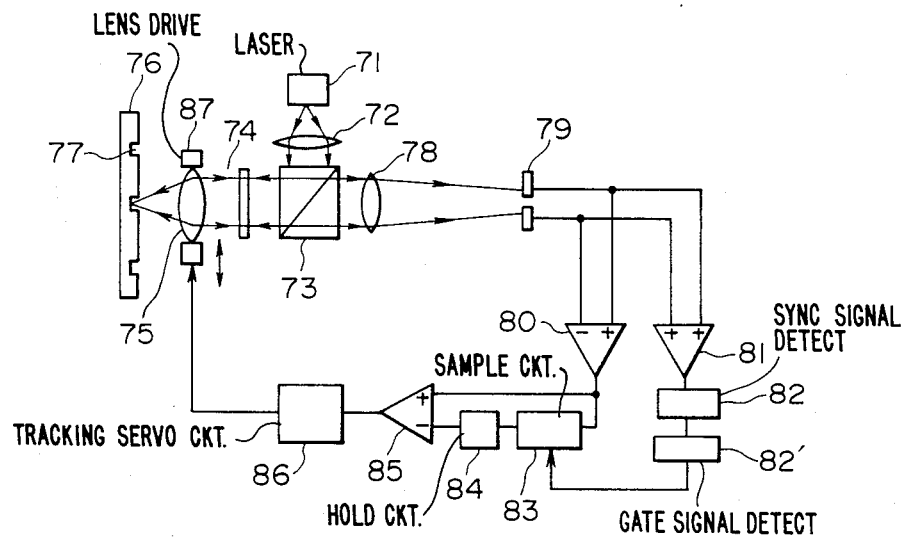
FIG. 7 is a block diagram useful for explaining one embodiment of the present invention.

FIG. 7 is a block diagram showing the construction of one embodiment of the present invention.

In the drawing, the light beam leaving a laser 71 is changed into parallel rays of light by a lens 72, passes through a prism 73, a λ/4 plate 74 (λ: laser wavelength) and an objective lens, and is converged on a disk 76 having information tracks as a spot of approximately 1 μmφ. A reflecting film or recording film is vapor-deposited on the disk 76 so that the light beam incident to the track 77 is reflected, again passes through the contracting lens 75, the μ/4 plate 74 and the prism 73 and is then led to the information detecting system. The information detecting system (with its auto-focus detecting system not shown) consists of a convergent lens 78 and an optical detector 79 whose light receiving surface is divided into two portions for detecting the track signals and the information signals.

Figure 8:
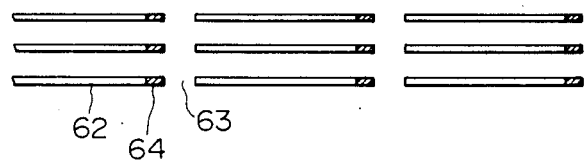
FIG. 8 illustrates the arrangement of the interrupting portion in relation to sector mark portions and information recording portion of a plurality of tracks of the guide groove.

As shown in FIG. 8, the disk 76 consists of a guide groove 62 for recording and reproducing the information, a mirror area 63 and a sector mark portion 64 for generating a timing which detects the mirror area 63. The guide groove 62 has a depth of approximately λ/8. The distribution of diffraction light, which is reflected depending upon the position of the incident spot with respect to this guide groove 62, changes, and this change is received by a two-part divided light detector 79. Each signal is differentially processed by a differential amplifier 80, thereby providing a tracking signal.

FIG. 9 illustrates the output waveforms from each circuit. FIG. 9(a) illustrates a normal tracking signal when there is no inclination of the disk. The wave form of the normal tracking signal due to eccentricity of the disk becomes a sine wave. Portions F represent a flat level in the in the signal indicative of the timing when the disk inclination occurs. In this case, the optical axis of the reflected light moves in accordance with the disk inclination, thereby causing an offset represented by Δ. When tracking of the information groove is started by the light spot, a tracking servo system tracks electrical zero as the track center so that track deviation occurs. The tracking signal at this time has a waveform such as shown in FIG. 9(c) and has the offset Δ when it passes through the mirror area. The output of two-part divided light detector is summed by a summing amplifier 81, an information signal can be obtained. A signal representing the sector mark portion 64 is obtained from the information signal by a synchronous signal detector 82 (shown in FIG. 9(d)). A gate signal generator 82' generates a gate signal for extracting the mirror area (shown in FIG. 9(e)). The gate signal is generated at the fall of the signal representing the sector mark portion 64. The gate signal is applied to a gate circuit (sample circuit) 83 and extracts a signal due to light reflected from the mirror area from the tracking signal from the differential amplifier 80. Its output is led to a hold circuit 84, which holds the extracted signal and detects the offset signal (shown in FIG. 9(f)). This signal is differentiated from the tracking signal by the differential amplifier 85 and the differential amplifier 85 produces a tracking signal in which the offset due to the disk inclination is compensated for. The tracking signal is applied, through the tracking servo circuit 86, to a lens driving device 87 for tracking. In this manner, tracking can be made accurately. Though the foregoing embodiment tracks by use of lenses, the present invention can be applied similarly to an embodiment in which tracking is effected by moving the light beam by mirrors.

When the mirror area is disposed in the buffer area, the gate signal may be generated after the passage of a predetermined period of time after the signal representing the sector mark portion 64 is detected.

In accordance with the present invention, the information groove can be accurately tracked because the offset in the tracking signal occurring due to the disk inclination can be compensated for.

What is claimed is:

1. An optical information processor comprising:
   a recording medium equipped with mirror areas for reflecting a light spot impinging on said recording medium, said mirror area being disposed in a track for optically recording and reproducing predetermined information;
   a light detector having two light receiving portions for receiving diffracted light from said track;
   first means for differentially processing the signals from said light receiving portions of said light detector and for providing a tracking signal for tracking said track;
   second means for detecting signals generated from said reflecting area in said tracking signal and providing an output indicative thereof;

third means for differentially processing the output from said first means and the output from said second means; and fourth means responsive to the output from said third means for controlling the position of the light spot in a direction transverse to the track.

2. In an optical information processor comprising:

an optical information recording medium having a track consisting of at least a sector mark portion and an information recording portion;

a light detector having two light receiving portions receiving the diffracted light generated when a light beam from a light source is radiated to said recording medium;

first means for differentially processing the signals from said light receiving portions of said light detector and providing a tracking signal for tracking said track; and second means for summing the signals from said light receiving portions of said light detector to obtain an information signal from said track; the improvement comprising:

said track having a mirror area for reflecting the light beam impinging on said recording medium between said sector mark portion and said information recording portion along said track;

third means for detecting a signal representing said sector mark portion from said information signal;

fourth means for sampling said tracking signal by the output of said third means and for holding the sampled signal;

fifth means for obtaining the difference between the output of said fourth means and said tracking signal and providing an output indicative thereof; and sixth means responsive to the output from said fifth means for controlling the irradiation position of said light beam on said recording medium so that said light beam correctly follows the track.

3. An optical tracking system comprising:

an optical disk having a guide groove of a plurality of tracks formed in advance and extending in the radial direction of said disk, each track of said guide groove having a plurality of interrupting portions;

an optical system for projecting a light beam from a light source to form a light spot on said optical disk;

light sensitive means having at least two light receiving portions located across a line parallel to the alignment of said track for detecting a reflected ray of said light spot from said optical disk;

first means coupled to said light sensitive means for differentially processing the signals from said light receiving portions of said light sensitive means and for providing a tracking signal for tracking said track;

second means coupled to said first means for sampling from the output of said first means a signal due to light reflected from said interrupting portion and for holding the sampled signal;

third means coupled to said first means and said second means for compensating said tracking signal in accordance with said sampled signal; and fourth means coupled to said third means, for controlling the position of said light spot in a direction transverse to said track in accordance with the compensated tracking signal from said third means.

4. An optical tracking system according to claim 3, further comprising fifth means coupled to said light sensitive means, for summing the signals from said light receiving portions of said light sensitive means, and sixth means coupled to said fifth means, for generating a gate signal indicating the timing at which said light spot comes into said interrupting portion, said second means including sampling means for sampling the output of said first means in response to said gate signal.

5. An optical tracking system according to claim 4 wherein each track of said guide groove is divided into a plurality of sectors, each of which includes a header portion in which a header signal containing at least a sector mark indicating the start of said sector is recorded and a data portion for recording predetermined information adjacent to said header portion, said interrupting portion being disposed between said sector mark and said data portion.

6. An optical tracking system according to claim 5, wherein said sixth means includes a circuit coupled to said fifth means for extracting a signal representing said sector mark, and a signal generator coupled to said circuit for generating said gate signal in response to said signal representing said sector mark.

7. An optical tracking system according to claim 3, wherein the length of said interrupting portion is such that said light spot is not affected by said guide groove adjacent said interrupting portion when said light spot is located at said interrupting portion.

8. An optical tracking system according to claim 7, wherein said interrupting portion is a mirror area which substantially reflects said light spot.

* * * * *